United States Patent Office 2,734,016
Patented Feb. 7, 1956

2,734,016

PROTAMINE ZINC ADRENOCORTICOTROPHIN WITH PROLONGED ACTION AND METHOD OF PREPARATION

Hugo Holtermann, Oslo, Norway, assignor to Nyegaard & Co. A/S, Oslo, Norway

No Drawing. Application March 20, 1952, Serial No. 277,732

Claims priority, application Norway March 31, 1951

9 Claims. (Cl. 167—74)

This invention relates to stable injectable therapeutic compositions containing adrenocorticotrophin (ACTH).

One object of my invention is the provision of a preparation containing adrenocorticotrophin with prolonged activity when injected intramuscularly or subcutaneously.

A further object of the invention is to provide pharmaceutical preparations containing adrenocorticotrophin which retain their potency for long periods when stored.

A further object of the invention is to provide a preparation containing adrenocorticotrophin with a great resistance to enzymatic degradation in the muscle and which for that reason is economical in use.

The preparation is further characterized by absence of harmful or undesirable physiological effects.

Adrenocorticotrophin (ACTH) is a water-soluble protein-peptide fraction obtained from the pituitary glands of pigs, sheep, horses and recently also of whales.

ACTH has, as is known, been found to possess excellent clinical properties in respect to a number of pathological states viz. rheumatoid arthritis, psoriasis, certain eye diseases and extensive burns.

Adrenocorticotrophin dissolved in water or a physiological salt solution exercises by intramuscular or subcutaneous injection a brief effect on the organism. The decrease of the circulatory eosinophile cells (eosinopenia) is usually taken as a measure of the clinical effect. The eosinopenia reaches its maximum about 4 hours after the injection and has disappeared after about 8 hours. The short duration of action has the effect that in clinical ACTH treatment it is usual to give an injection every sixth hour, i. e. 4 injections per 24 hours. This necessity is troublesome and restricts the usefulness of ACTH.

From the literature it appears that there has been great difficulty in making long-acting adrenocorticotrophin preparations. Attempts have been made to solve the problem by adsorbing adrenocorticotrophin to aluminum phosphate in colloidal suspensions; further, adrenocorticotrophin has been adsorbed to aluminum monostearate, suspended in oil. The first mentioned preparations must be mixed from at least 2 solutions (ampules) before use. The action of the oil suspension is less protracted and leaves "lumps" at the seat of injection. Local irritations are also frequent with the hitherto known preparations. As they are colloids or oils they are also inconvenient for administration.

By the method described in the invention preparations are produced which are not encumbered by the said drawbacks.

By the new method ACTH suspensions are produced which when they are injected intramuscularly or subcutaneously are resorbed very slowly from the injection locality, whereby a prolonged or deposit effect is attained which involves that the action of the injected ACTH lasts more than 24 hours.

Adrenocorticotrophin is a substance defined by its biological effect. It can be prepared from the pituitaries of a number of animals (pigs, sheep, whales, horses, oxen, etc.) in the form of a relatively pure protein or protein mixture, the average molecular weight of which depends on the mode of production. It can also in part be degraded enzymatically or acid-hydrolytically to polypeptides without loss of adrenocorticotropic effect.

Now it has long been known (A. Kossel, Dtsch. Med. Wochensch. 1894) that certain proteins combine with protamine.

Andrew Hunter (Ztsch. f. Physiol. Chem. 1907, 53, 526) found likewise that a number of proteins could be precipitated, while some of the polypeptides examined did not react with protamines.

A. Kleczkowski (Biochem. J. 1946, 40, 677) found that ribonuclease, globin, clupein, serum-albumin and serum-globin by mixture in pairs at a pH in which the components are oppositely charged, afford precipitates, which however, generally dissolve again by the addition of salt. Tobacco mosaic virus acted in this respect like other proteins. H. G. Buhnenberg found that by combination of clupein with serum albumin there ensued a denaturation of the latter (Biochem. Ztsch. 1932, 221, 292).

From the collected literature on the theme under discussion it seems clear that proteins as a rule precipitate with protamines at a pH in which the two components are oppositely charged. The precipitate is often soluble in salt water, and denaturation may occur.

There exists moreover an extensive literature on the precipitability of nucleoproteins with protamines.

The purest adrenocorticotropic protein which is prepared has its isoelectric point at pH 4.7 and it might have been expected therefore that adrenocorticotrophin would be precipitated with protamine at pH 6–7. I have found, however, that such is not the case, and that the presence of zinc ions is necessary to enable the adrenocorticotrophin to enter into a complex compound with the protamine. It is true that if the precipitation is effected with protamine without the presence of zinc, a precipitate is in fact formed, but I have found that the adrenocorticotropic effect is recovered in the solution which is obtained, for example, after centrifugation.

Thus the adrenocorticotropic protein behaves differently from insulin, which can be precipitated with protamine alone, without the presence of zinc.

I have discovered that the adrenocorticotrophin can be converted to a stable derivative with prolonged activity, when injected intramuscularly or subcutaneously and which forms a suspension, by the addition to an aqueous adrenocorticotrophin solution of an alkaline protein or protein degradation product and a water soluble zinc salt, whereby the pH of the solution by the addition of a buffer salt or a buffer salt mixture is adjusted at a pH of between 6 and 8, and as alkaline protein it has been found particularly advantageous to use protamine sulphate. As zinc salt zinc sulphate is preferably used.

The adjustment of the preparation to a pH 6–8 is effected conveniently by means of a trisodium phosphate solution.

In order to make the preparation durable small amounts of preservatives are also added, and for this purpose the use of tricresol or some other similarly acting phenol is recommended.

It has been found that for the attainment of a satisfactory suspension formation (suspensibility) it is important that the tricresol should not be added before the degree of acidity of the solution is adjusted to the desired pH.

The adrenocorticotrophin forms with the added substances a compound of low solubility, which makes a non-coagulating suspension in the aqueous medium of low sedimentation rate. In the course of time the particles will however sedimentate at the bottom of the container or the ampule in which the preparation is kept.

But by shaking the ampule the substance which has collected at the bottom is again converted into a homogeneous suspension. The activity of the product is unaltered after storage for a long time.

By clinical tests it has been found that a distinctly prolonged effect is obtained by the new preparation, without any observable drawbacks by the administration of the preparation.

In accordance with an embodiment of the process the suspended particles consisting of the adrenocorticotrophin substance are separated from the suspension medium, for instance by means of centrifugation or filtering. With or without previous washing the separated particles can be resuspended in another suspension medium. Due to the low solubility of the substance the losses are small during these separating and resuspension steps. The particles can be resuspended in for example hydrophobic solid media as waxes or liquids for instance oils and used in this form for injection purposes.

The following is an example of the mode of carrying out of the process.

550 mg. ACTH (standard), extracted from the frontal lobes of pituitaries of whales, is dissolved in 18.15 ml. aqueous 1% protamine sulphate solution. To this is added 0.56 ml. water containing 92.84 mg. zinc sulphate, and then 22 mg. glucose dissolved in 0.28 ml. water. The pH is then adjusted at 7.0–7.2 by the addition with stirring of approximately 243 mg. trisodium phosphate in about 1.2 ml. water. After the main body, or the whole, of the trisodium phosphate solution has been added, 67 mg. tricresol is added and the volume filled up to 22 ml. with distilled water.

The eosinopenia curve and other clinical observations show that the action of preparations of this type lasts more than 24 hours after injection.

The preparation produced according to the method under discussion has been found to possess very favourable properties for clinical use, namely:

(a) Retention of the clinical adrenocorticotropic action by intramuscular injection.

(b) Little solubility in tissue fluids, and thereby prolonged action.

(c) Resistance to enzymatic degradation in the muscle, and for that reason economical in use.

I claim:

1. A process of making an adrenocorticotrophin preparation with prolonged action by converting adrenocorticotrophin to a stable suspension, which comprises incorporating protamine and a water-soluble zinc salt selected from the group consisting of zinc chloride and zinc sulphate into an aqueous adrenocorticotrophin solution and adjusting the pH of the liquid to between 6 and 8 by the addition of a buffer salt mixture.

2. A process of making an adrenocorticotrophin preparation with prolonged action by converting adrenocorticotrophin to a stable suspension, which comprises adding protamine-sulphate and a water-soluble zinc salt selected from the group consisting of zinc chloride and zinc sulphate to an aqueous adrenocorticotrophin solution and adjusting the pH of the liquid to between 6 and 8 by the addition of trisodium phosphate.

3. A process according to claim 2, which comprises the further step of adding a preservative amount of tricresol after the pH of the liquid has been adjusted to a pH between 6 and 8.

4. A long-acting adrenocorticotrophin preparation adapted for intramuscular injection, comprising a stable aqueous suspension of a difficultly-soluble combination of adrenocorticotrophin wtih protamine and zinc, the pH of the suspension being adjusted to between 6 and 8 by means of a buffer salt.

5. A long-acting adrenocorticotrophin preparation adapted for intramuscular injection, comprising a stable aqueous suspension of a difficultly-soluble combination of adrenocorticotrophin with protamine-sulphate and zinc sulphate, the pH of the suspension being adjusted to between 6 and 8 by means of trisodium phosphate.

6. A preparation as claimed in claim 4, and also containing a preservative.

7. A preparation as claimed in claim 4, and also containing a preservative amount of a phenolic compound.

8. A preparation as claimed in claim 4, and also containing a preservative amount of tricresol.

9. A preparation as claimed in claim 4, wherein each cubic centimeter thereof contains about 25 mg. of ACTH, about 8 mg. of protamine-sulphate, about 4 mg. of zinc sulphate, and about 3 mg. of tricresol, the balance being substantially water and the pH of the suspension being adjusted to between 6 and 8 by means of a buffer salt.

References Cited in the file of this patent

UNITED STATES PATENTS

| | | |
|---|---|---|
| 2,161,198 | Reiner et al. | June 6, 1939 |
| 2,179,384 | Scott et al. | Nov. 7, 1939 |
| 2,446,974 | Chow | Aug. 10, 1948 |

OTHER REFERENCES

Selye: Textbook of Endocrinology, pg. 215 (1947).
Jensen: Insulin, Its Chemistry and Physiology (pp. 44–45, 49–50) (1938).